United States Patent
Slaughter et al.

(10) Patent No.: US 8,493,628 B2
(45) Date of Patent: Jul. 23, 2013

(54) REPRODUCTION OF IMAGES ONTO SURFACES

(75) Inventors: Victor Blakemore Slaughter, Manchester, MO (US); Todd Raftery, Wentzville, MO (US)

(73) Assignee: The Boeing Company, Chicago, IL (US)

(*) Notice: Subject to any disclaimer, the term of this patent is extended or adjusted under 35 U.S.C. 154(b) by 1162 days.

(21) Appl. No.: 11/584,919

(22) Filed: Oct. 20, 2006

(65) Prior Publication Data

US 2007/0104391 A1    May 10, 2007

Related U.S. Application Data

(63) Continuation-in-part of application No. 11/112,698, filed on Apr. 21, 2005, now abandoned.

(51) Int. Cl.
*G06T 15/50* (2011.01)

(52) U.S. Cl.
USPC ........... 358/3.24; 345/419; 345/426; 358/1.9; 382/103; 382/149; 702/35; 702/40

(58) Field of Classification Search
USPC ........... 345/419, 426; 358/1.9, 3.24; 382/103, 382/149; 702/35, 40
See application file for complete search history.

(56) References Cited

U.S. PATENT DOCUMENTS

| | | | |
|---|---|---|---|
| 3,975,226 A | 8/1976 | Boettcher | |
| 4,118,264 A | 10/1978 | Boettcher | |
| 4,947,666 A | 8/1990 | Hametner et al. | |
| 5,204,055 A * | 4/1993 | Sachs et al. | 419/2 |
| 5,240,334 A | 8/1993 | Epstein et al. | |
| 5,402,351 A | 3/1995 | Batchelder et al. | |
| 5,511,150 A | 4/1996 | Beaudet et al. | |
| 5,831,641 A | 11/1998 | Carlson | |
| 5,854,643 A | 12/1998 | Katsuyama | |
| 5,980,132 A | 11/1999 | Kawai | |
| 6,000,775 A | 12/1999 | Muraki | |
| 6,084,691 A | 7/2000 | Tsai et al. | |
| 6,102,590 A | 8/2000 | Harris et al. | |
| 6,189,246 B1 | 2/2001 | Gorthala | |
| 6,360,656 B2 * | 3/2002 | Kubo et al. | 101/35 |
| 6,415,050 B1 | 7/2002 | Stegmann et al. | |
| 6,523,921 B2 | 2/2003 | Codos | |

(Continued)

OTHER PUBLICATIONS

USPTO Office Action, dated Sep. 11, 2008, regarding U.S. Appl. No. 11/112,698, 14 pages.

(Continued)

*Primary Examiner* — Peter K Huntsinger
(74) *Attorney, Agent, or Firm* — Yee & Associates, P.C.

(57) ABSTRACT

Systems and methods of reproducing images onto surfaces are disclosed. In one embodiment, the system includes an image file that digitally produces a planar surface normal to a surface of a master model. The planar surfaces are referenced to a coordinate system of the master model through a series of points. A tracker surfacing system, comprising a tracking instrument, generates and emits a signal as the tracking instrument crosses the planar surface. An output device is actuated by the tracking device as it crosses the planar surface, reproducing the series of points as an image onto a surface, including a flat, curved or compound surface. Both the spatial position and orientation of the output device are detected and adjustments are made so that the image is precisely applied to intended locations on the surface being imaged.

14 Claims, 7 Drawing Sheets

U.S. PATENT DOCUMENTS

| | | | |
|---|---|---|---|
| 6,658,314 B1 | 12/2003 | Gothait | |
| 6,760,693 B1 | 7/2004 | Singh et al. | |
| 6,970,600 B2 | 11/2005 | Abe | |
| 7,047,151 B2* | 5/2006 | Chang | 702/152 |
| 7,349,123 B2 | 3/2008 | Clarke et al. | |
| 2001/0017085 A1* | 8/2001 | Kubo et al. | 101/35 |
| 2003/0033104 A1* | 2/2003 | Gooche | 702/95 |
| 2006/0238815 A1 | 10/2006 | Polus | |
| 2007/0103467 A1 | 5/2007 | Polus et al. | |

OTHER PUBLICATIONS

Response to Office Action, dated Jan. 12, 2009, regarding U.S. Appl. No. 11/112,698, 8 pages.
USPTO Final Office Action, dated Apr. 14, 2009, regarding U.S. Appl. No. 11/112,698, 17 pages.
Response to Final Office Action, dated Aug. 12, 2009, regarding U.S. Appl. No. 11/112,698, 10 pages.
USPTO Office Action, dated Nov. 9, 2009, regarding U.S. Appl. No. 11/112,698, 14 pages.
Response to Office Action, dated Feb. 9, 2010, regarding U.S. Appl. No. 11/112,698, 6 pages.
USPTO Office Action, dated May 12, 2010, regarding U.S. Appl. No. 11/112,698, 17 pages.
Response to Office Action, dated Sep. 8, 2010, regarding U.S. Appl. No. 11/112,698, 6 pages.
USPTO Office Action, dated Nov. 24, 2010, regarding U.S. Appl. No. 11/112,698, 18 pages.
Response to Office Action, dated Mar. 24, 2011, regarding U.S. Appl. No. 11/112,698, 12 pages.
USPTO Final Office Action, dated Jun. 9, 2011, regarding U.S. Appl. No. 11/112,698, 21 pages.
USPTO Office Action, dated Dec. 1, 2009, regarding U.S. Appl. No. 11/584,922, 18 pages.
Response to Office Action, dated Feb. 26, 2010, regarding U.S. Appl. No. 11/584,922, 25 pages.
USPTO Final Office Action, dated Jun. 9, 2010, regarding U.S. Appl. No. 11/584,922, 25 pages.
Response to Final Office Action, dated Aug. 9, 2010, regarding U.S. Appl. No. 11/584,922, 27 pages.
USPTO Office Action, dated Sep. 20, 2011, regarding U.S. Appl. No. 11/584,922, 20 pages.
Response to Office Action, dated Jan. 18, 2012, regarding U.S. Appl. No. 11/584,922, 14 pages.
USPTO Final Office Action, dated Feb. 22, 2012, regarding U.S. Appl. No. 11/584,922, 21 pages.
Response to Final Office Action, dated Apr. 30, 2012, regarding U.S. Appl. No. 11/584,922, 12 pages.
USPTO Office Action, dated Jul. 2, 2012, regarding U.S. Appl. No. 11/584,922, 24 pages.
Final Office Action, dated Oct. 30, 2012, regarding U.S. Appl. No. 11/584,922, 25 pages.

* cited by examiner

REPRODUCTION OF IMAGES ONTO SURFACES

CROSS REFERENCE TO RELATED APPLICATIONS

This application is a continuation-in-part of U.S. patent application Ser. No. 11/112,698, filed Apr. 21, 2005 now abandoned.

BACKGROUND OF THE INVENTION

1. Field of the Invention

This invention generally relates to systems that reproduce images, and more specifically, to systems that reproduce images onto surfaces, including compound curved surfaces.

2. Description of the Related Art

Complex surfaces, including small components such as mechanical parts or large objects such as buildings, have traditionally been mapped using standard methods, including mylar transfer templates, theodolites laser trackers, and more recently, laser projectors. Generally, these methods are time consuming, tedious and may lack accuracy. For example, a laser projector may be used to project two-dimensional images onto a contoured surface. The projected images are used as patterns for manufacturing products and locating an image onto a desired location. For example, an image may be projected onto a ply manufactured for airplane fuselages, and the like. To be effective, the laser emitter must generally be positioned in an accurate and precise manner. The projector's designated points and angles, however, may not be accurately controlled. It becomes necessary to use multiple laser projector heads to accurately project the lines in their proper location, the larger the projected image and the more complex the surface it is to be projected upon. In addition, the focal length of the laser may be hindered by physical objects, i.e. floors, walls, support posts, & ceilings. If the projection head can not be placed far enough away from the object, it will be unable to project over the entire surface thus requiring more equipment or additional set-ups.

Recently, theodolites have been employed to provide for greater accuracy in determining the coordinates of the reference marks. A theodolite is a mounted optical instrument, which measures horizontal and vertical angles in space. Though it may accurately define a point from the horizontal and vertical angles of a surface relative to a given coordinate system, it typically does not indicate the object geometry, including shape, dimension, and location. Generally, a theodolite is fairly expensive, time consuming and labor intensive. Moreover, current methods of mapping complex surfaces lack the ability to print images onto complex contoured surfaces that have no physical points of reference.

A further problem in mapping and marking surfaces relates to the need to properly position surface marking devices such as a printer, so that the markings are precisely applied at the correct locations on the marking surface. An error in marking the surface can result in scrap and/or production delays. It would be desirable to automatically verify that the marking device is in the correct location before it is actuated, and to control the verification process as well as the firing process automatically.

Accordingly what is needed is a system and method for reproducing images onto surfaces in which the spatial position an image producing device, such as a printer, is automatically verified as being correct before the surface is marked. The invention is directed toward satisfying this need.

BRIEF SUMMARY OF THE INVENTION

The invention is directed to systems and methods of reproducing images onto surfaces, in which the position of a marking device such as a printer is verified as correct before the image is reproduced onto the surface. Embodiments of the invention generally provide a method of outputting images, including-lines, cross hairs and text, onto complex surfaces, including complex contoured surfaces.

In accordance with one aspect of the invention, a system is provided for reproducing an image on a surface. The system comprises a model containing a feature to be reproduced as an image on the surface. An imaging device is movable over the surface for reproducing the feature as an image on the surface at a location based on the location of the feature in the model. A tracker is used to track the three dimensional position of the imaging device, and a computer program is provided for correlating the position of the imaging device determined by the tracker with the three dimensional position of the feature in the model. A controller controls the operation of the imaging device based on the correlated position of the tracker.

In accordance with another aspect of the invention, a method is provided for reproducing an image on a surface, comprising the steps of: determining the position of features on a three dimensional model; moving an imaging device over the surface; determining the position of the imaging device; correlating the position of the features in the model with the position of the imaging device; and, reproducing an image of the features on the surface at a location on the surface based on the results of the correlation.

According to still another aspect of the invention, a method is provided for reproducing an image on a surface, comprising the steps of: obtaining the three dimensional location of a feature in a model; obtaining the three dimensional location of an imaging device; correlating the obtained three dimensional location of the feature with the obtained three dimensional location of the imaging device based on a common, three dimensional coordinate system; determining the location on the surface where an image of the feature should be reproduced based on the results of the correlation; and, reproducing an image of the feature at the determined location imaging device.

Other features, benefits and advantages of the invention will become apparent from the following description of the invention, when viewed in accordance with the attached drawings and appended claims.

BRIEF DESCRIPTION OF THE SEVERAL VIEWS OF THE DRAWINGS

Preferred and alternate embodiments of the invention are described in detail below with reference to the following drawings.

DETAILED DESCRIPTION OF THE INVENTION

The invention relates to systems and methods for reproducing images onto surfaces. Many specific details of certain embodiments of the invention are set forth in the following description and in FIGS. 1-12 to provide a thorough understanding of such embodiments. One skilled in the art, however, will understand that the invention may have additional embodiments, or that the invention may be practiced without one or more of the details described in the following description.

In general, embodiments of methods and systems in accordance with the invention may be used for reproducing images onto a variety of surfaces. The surfaces may include relatively simple contoured surfaces, or compound contoured surfaces, including surfaces encountered in aeronautical, automotive, and marine applications. In further embodiments, the surfaces may include relatively flat surfaces, including, for example, signs, billboards, and any other suitable surfaces.

Figure 1:
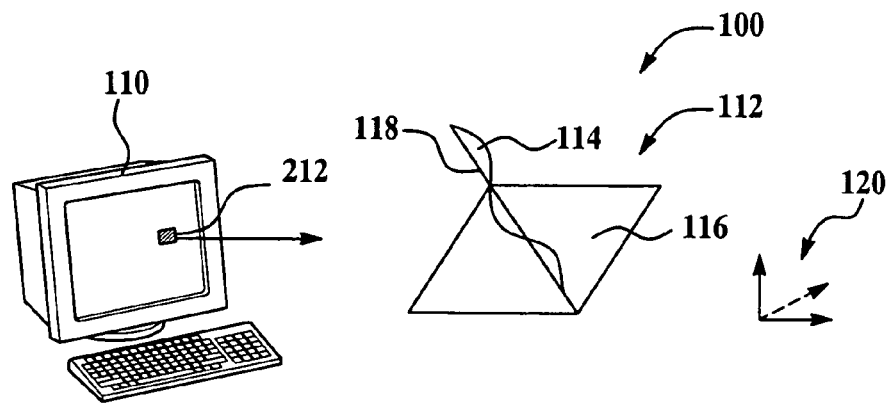
FIG. 1 is a schematic view of the system for reproducing images onto surfaces, according to one embodiment of the invention.

FIG. 1 is a schematic view of a system for reproducing images onto surfaces 100, including compound contoured surfaces. The system may include an operating interface 110 comprising a computer, such as a desktop, laptop, or any other suitable interface device. The operating interface 110 may be used to produce and store an image file 112. In one embodiment, the image file 112 may comprise a digitally produced igs (image grayscale system) file, or other suitable digital file. An igs file may display a full range of black and white images, including various shades of gray. The image file 112 may then be adapted to digitally produce a planar surface 114 normal to a surface of a master model by extruding the line created from the intersection of the edge of a modeled part and the digital master model surface 116.

The planar surface 114 may be extruded from the surface of a master model 116, such as a mechanical part like an aircraft stiffener, for example, to a plane 118 normal to the outer mold of the master model. The resulting extruded planar surface 114 may be referred to as a "fence file". The extruded planar surface (i.e. fence file) 114 may appear to look like a ribbon, following the contours of the master model 116 created by extruding the lines normal to the surface of the master model 116. These surfaces 114 may be referenced to a coordinate system 120 of the master model 116 through a series of points (not shown). In one particular embodiment, the coordinate system 120 may comprise a Cartesian coordinate system. In alternate embodiments, the coordinate system 120 may include a two-intersecting planar system, a three-intersecting planar system, or any other suitable coordinate system.

Figure 2:
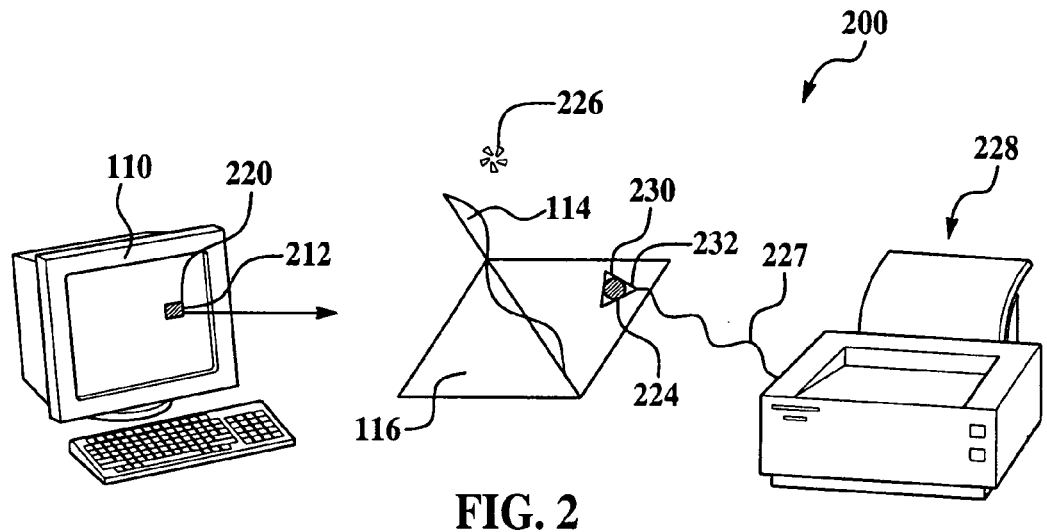
FIG. 2 is a schematic view of the system for reproducing images onto surfaces, according to another embodiment of the invention.

FIG. 2 is a schematic view of another embodiment of the invention. In addition to producing and storing the image file 112, the operating interface 110 may comprise a tracker surfacing system 220, which includes a design program 212. In one embodiment, the design program 212 includes a computer aided design program (CAD) that can model surfaces via a computer. The CAD program may, for example, be a commercially available program, including the Unigraphics program available from Electronic Data Systems Corporation of Plano, Tex., the CATIA® program available from Dassault Systems Corporation of Suresnes, France, or any other suitable CAD program. The CAD program may be adapted to convert the "blueprint" drawings to create two-dimensional (2-D) drawings or three-dimensional (3-D) models. The design program 212 may further include a Computer-Aided Inspection Program, including, for example, the VERISURF® Computer Aided Inspection Program commercially-available from Verisurf Software, Inc. of Anaheim, Calif. The Computer Aided Inspection Program may compare actual readings from an actual device to theoretical designed model surfaces.

Still referring to FIG. 2, the tracker surfacing system 220 may also include a tracking instrument 224. The design program 212 may be adapted to generate and emit a signal 226 as the tracking instrument 224 crosses the extruded plane (or fence file) 114. In one particular embodiment, the tracking instrument 224 includes a tracker ball 225 and uses software that samples how close the center (0,0,0) of the tracker ball 225 is to the extruded fence file 114. As the center of the ball 225 crosses the extruded plane 114, the tracking instrument 224 may emit an electrical signal. In one embodiment, the signal 226 may be transmitted via a cable 227 to an output device 228. In another embodiment, the signal 226 may be transmitted via electromagnetic waves, acoustic signals, optical signals, or any other suitable means. In operation, the crossing of the tracking instrument 224 over the planar surface 114 may actuate the output device 228. More specifically, in one particular embodiment, the output device 228 may include an ink jet printer, and the tracking instrument 224 may emit an electrical signal that triggers the ink jet to fire. If necessary, the ink jet may be set to fire numerous shots in quick succession. The output device 228 may be used to reproduce the series of points of the master model 116 onto a surface (not shown). The output device 228 may include a printer, scanner, facsimile, laser, electron beam, computer display, and other suitable devices.

Figure 6:
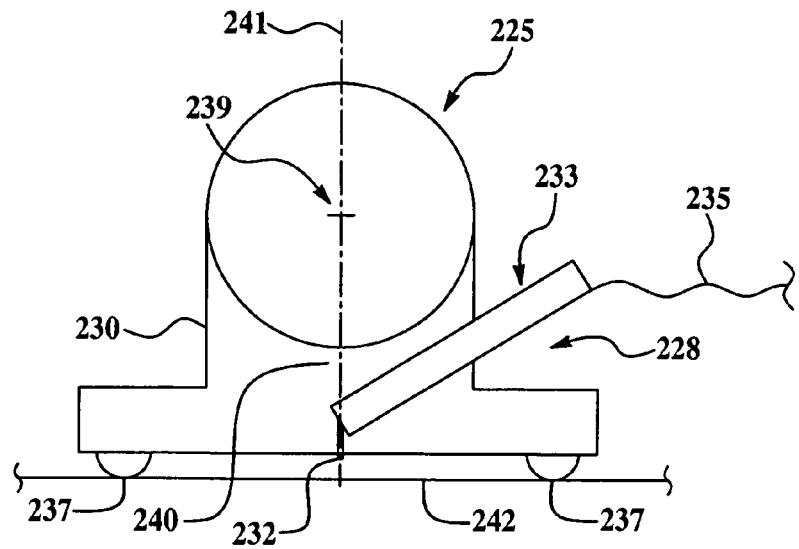
FIG. 6 is a side cross-sectional view of a tracking instrument in accordance with an embodiment of the invention.

In an alternate embodiment, the output device 228 may be mechanically coupled to the tracking instrument 224. For example, FIG. 6 is a side cross-sectional view of a tracking instrument 224 in accordance with an embodiment of the invention. In this embodiment, the tracking instrument 224 may include a housing member 230 that operatively supports a tracking ball 225 and an output device 228. In alternate embodiments, the tracking instrument 224 may include a laser tracking ball, a laser tracker projector, or any other suitable tracker surfacing instruments. The output device 228 includes an ink jet head 232 coupled to an ink reservoir 233. A power lead 235 provides power to the output device 228, and feet (or rollers) 237 support the housing 230. As further shown in FIG. 6, a center point 239 of the tracking ball 225 is aligned with the ink jet head 232 along a tracking axis 241.

Figure 3:
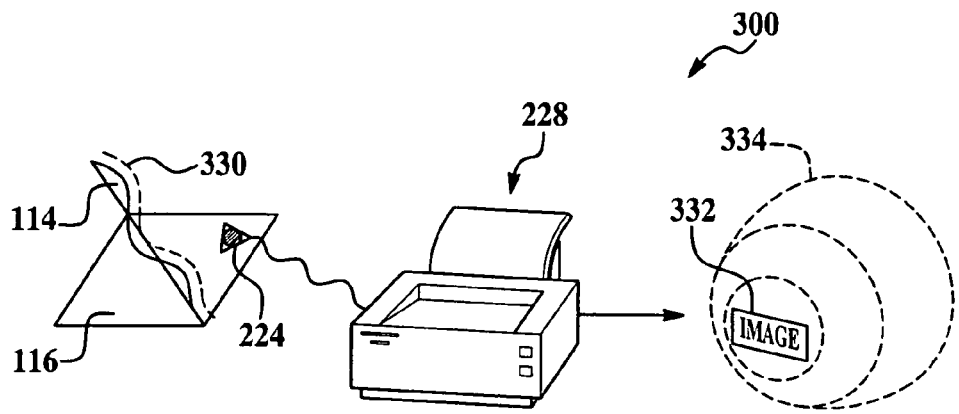
FIG. 3 is a schematic view of a system for reproducing images onto surfaces, according to yet another embodiment of the invention.

Referring to FIG. 3, a tracking instrument 224 may track the extruded plane 114, as previously described with reference to FIG. 2. As the tracking instrument 224 tracks the planar surface 114, the tracking instrument 224 may actuate the output device 228 to reproduce the series of points 330 of the master model. In one particular embodiment, as the tracking instrument 224 is passed over the planar surface 114 at different locations, a point 330 may be produced at each intersection (not shown). The series of points 330 may then be reproduced as an image 332 onto a surface 334, including onto a flat, curved, or compound surface.

Figure 4:
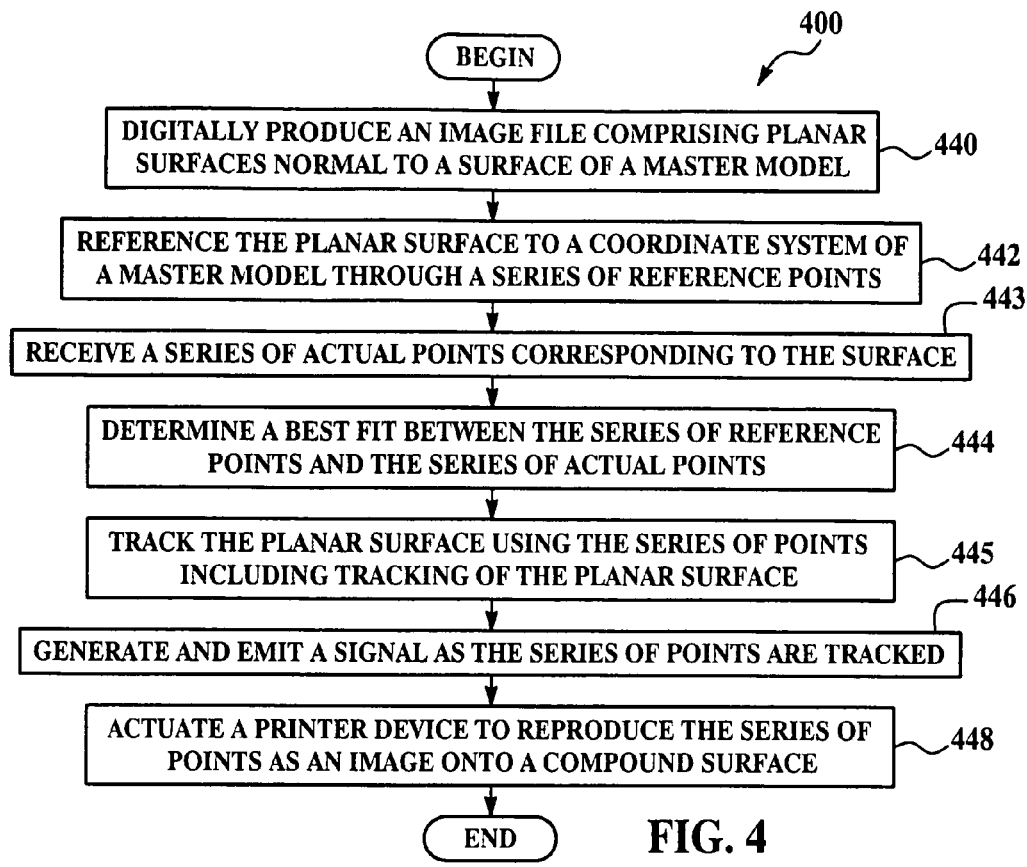
FIG. 4 is a block diagrammatic view of a method of reproducing images onto surfaces, according to an embodiment of the invention.

FIG. 4 is a block diagrammatic view of a method of reproducing images onto surfaces. At block 440, an image file comprising planar surfaces normal to a surface of a master model is digitally produced. The image file may be digitally produced by an interface operator 110, as previously described with reference to FIG. 1. The master model may then be referenced, at a block 442, in a coordinate system through a series of reference points that are coordinated between the actual part and the digital model. At block 443, the actual points are imported into the digital model, and at block 444, a best fit between the two sets of reference points is determined. At block 445, the series of reference points may be used to track the planar surface extruded from the master model. A tracking instrument 224, as previously described with reference to FIG. 2 and FIG. 3, may be employed to track the planar surface. As the series of reference points are tracked, a signal may be generated and emitted at block 446 by a design program, such as a CAD program. An output device (e.g. a printer) may be actuated, at block 448, by the tracking instrument 224 to reproduce the series of reference points as an image onto a surface. In particular embodiments of the invention, the surfaces may include contoured surfaces and compound contoured surfaces, including aeronautical, automotive, and marine surfaces. In alternate embodiments, the surfaces may include relatively flat surfaces, including, for example, signs, billboards, stadium grounds art and layouts, and any other suitable applications.

Figure 5:
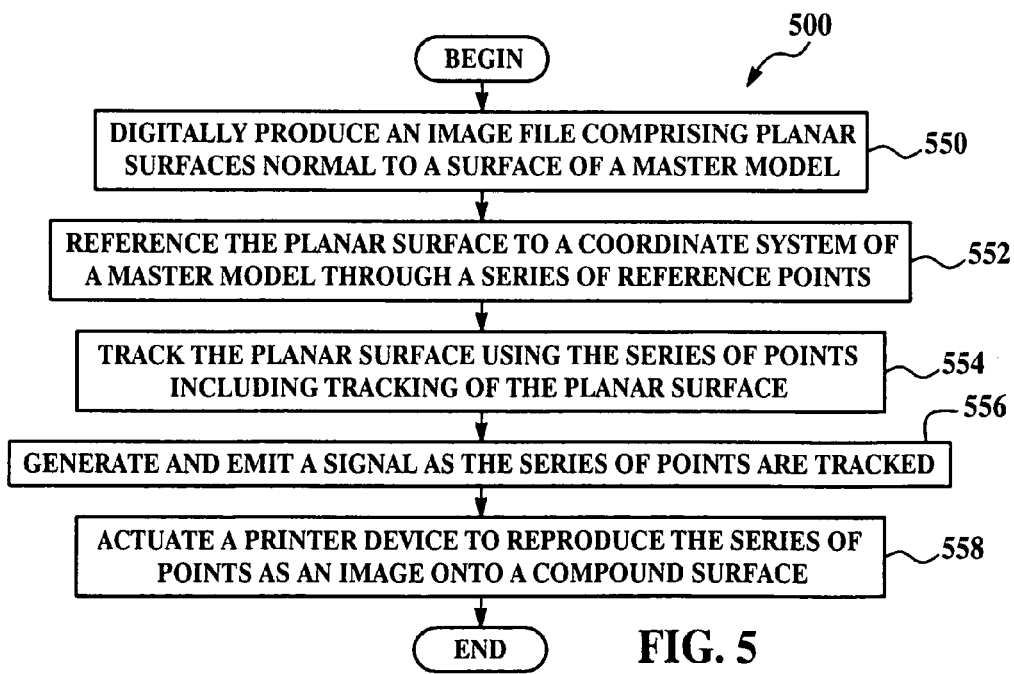
FIG. 5 is a block diagrammatic view of a method of reproducing images onto surfaces according to yet another embodiment of the invention.

FIG. 5 is a block diagrammatic view of a method of reproducing images onto surfaces, according to another embodiment of the invention. At block 550, an image file comprising planar surfaces normal to a surface of a master model is digitally produced. The master model may then be referenced, at block 552, in a coordinate system through a series of points. At block 554, the series of points may be used to track the planar surface extruded from the master model. A tracking instrument, as previously described with reference to FIG. 2 and FIG. 3, may be employed to track the planar surface. As the series of points are tracked, a signal may be generated and emitted at block 556 by a design program, such as a CAD program. An output device may be actuated, at block 558, by the tracking device 224 to provide an image onto a surface, such as a surface of a vehicle. In alternate embodiments, as described above with respect to the method 400 shown in FIG. 4, a series of actual points may be imported into the digital model (block 443), and a best fit between the two sets of points may be determined (block 444).

Figure 7:
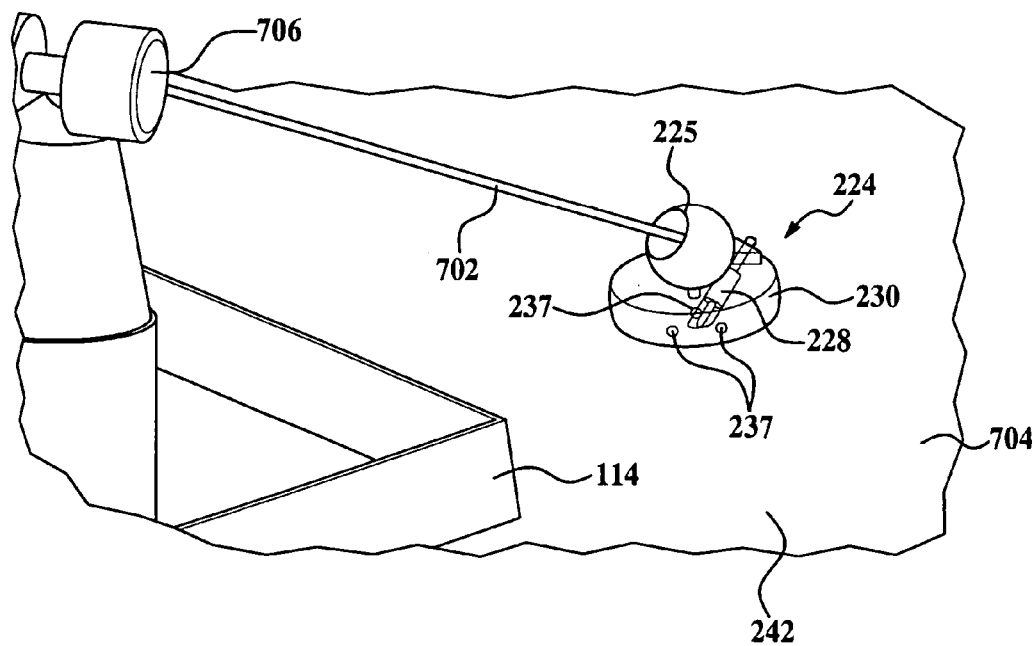
FIG. 7 is an enlarged, perspective view showing the tracking instrument on a surface relative to a fence file and a laser tracker beam.

In accordance with the invention, a system and method are provided for assuring that the spatial position of the output device 228 is correct when the markings are applied so that the markings may be reproduced at the correct locations on the marking surface 242. FIG. 7 shows the tracking instrument 224 supported on a surface, marking surface 242, to be marked by feet 237 on the bottom of the body 230. A laser beam 702 from a laser tracker 706 may be reflected from the tracking ball 225 so that the position of the tracking instrument 224 can be continuously tracked. As previously described, when the tracking instrument 224 traverses a fence file 114, the output device 228 can be fired to produce a marking corresponding to a feature at the reference location of the feature in the model, which, as previously explained, may be a CAD file. Accordingly, it is important that the exact location of the tracking device 224 be known so that firing signals are delivered to the output device 228 only when the tracking instrument 224 is in a position that will result in the markings being reproduced at the correct location. The invention achieves marking location precision using a system that employs software programs. These software programs can correlate the three dimensional location of the tracking instrument 224 with the three dimensional location of the model features, using a common coordinate system.

Figure 8:
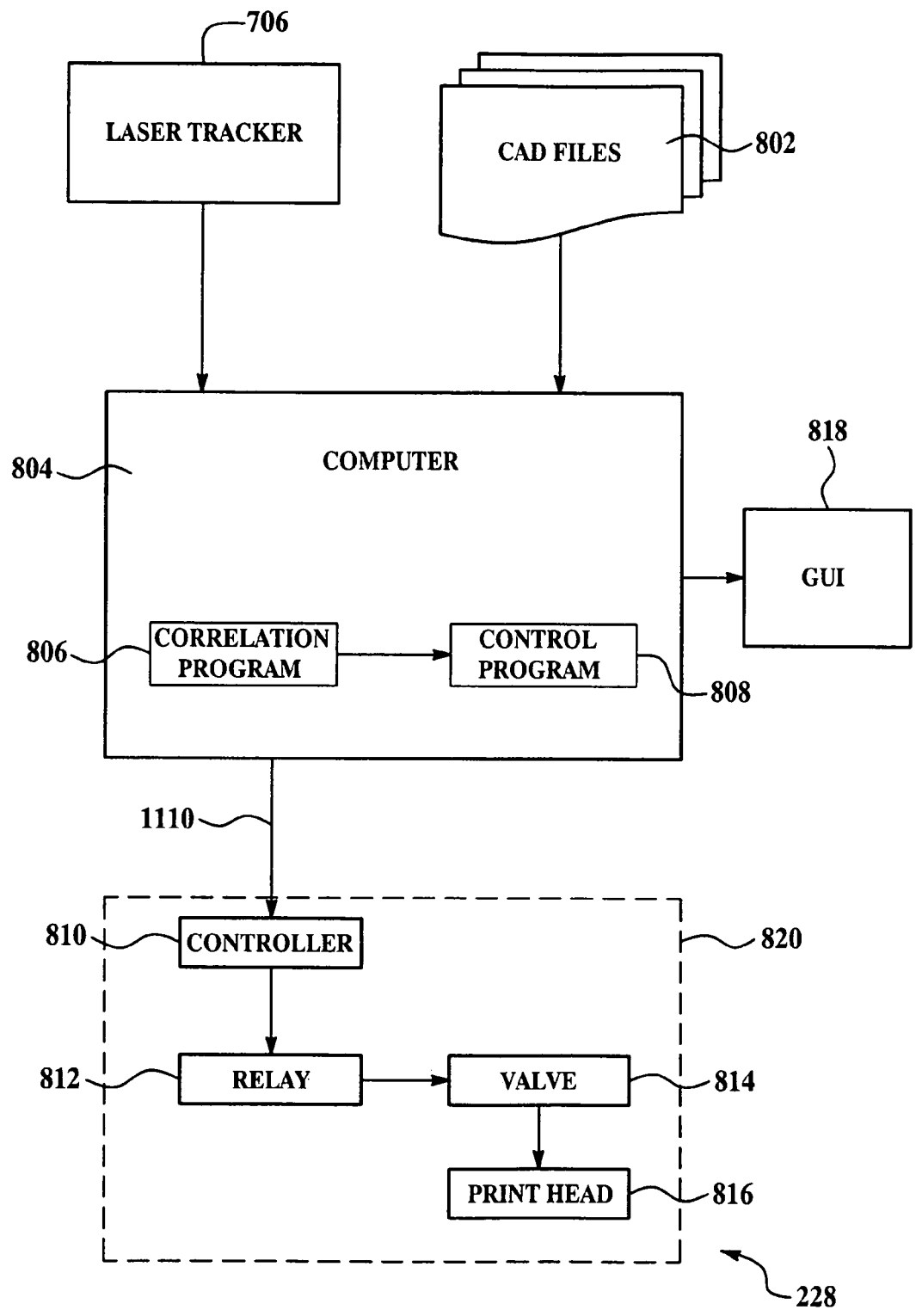
FIG. 8 is a broad block diagram of the system for controlling the output device.

Referring to FIG. 8, the laser tracker 706 may monitor the exact three dimensional position of the tracking instrument 224, using the tracking ball 225 (FIG. 7). The laser tracker 706 may continuously transmit the exact three dimensional location of the tracking instrument 224 based on a chosen coordinate system, such as a Cartesian system in which a location is defined in terms of x, y and z coordinates. A model whose features are to be marked on the marking surface 242 may be stored in CAD files 802. This stored information may include the location of the model features in terms of the coordinate system used by the laser tracker 706. The feature location information is delivered to a computer 804, which may comprise the previously described operating interface 110, or a separate computer.

Figure 12:
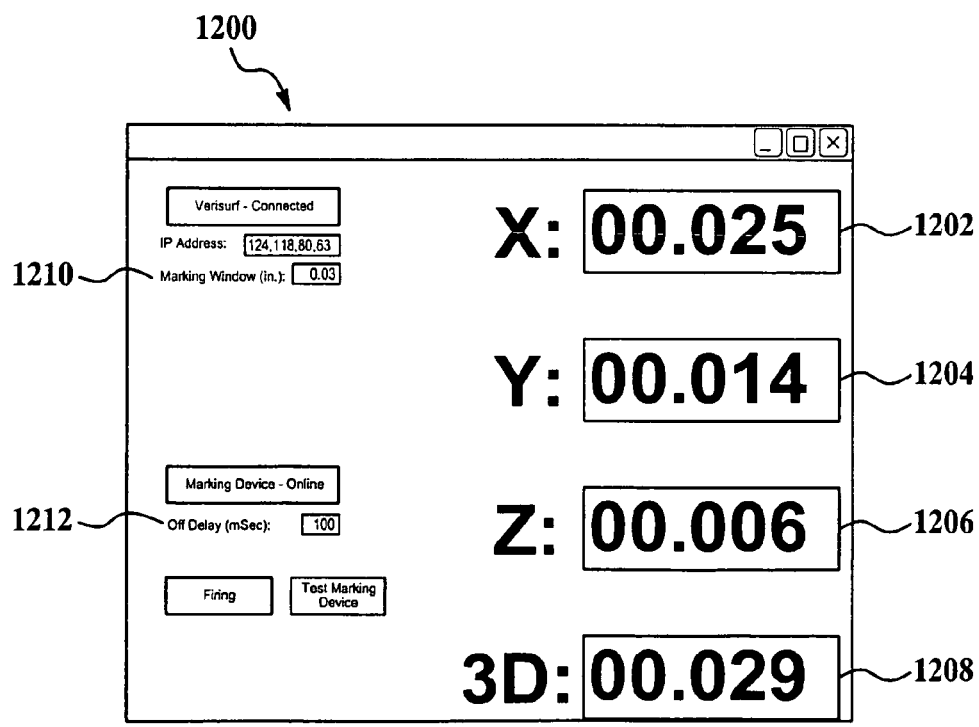
FIG. 12 is a screen capture of a graphical user interface display, showing the variances between the tracker location and the feature location

The computer 804 may include a correlation program 806 and a control program 808. The correlation program 806 may comprise the previously described VERISURF© Computer Aided Inspection Program which is a commercially available software package that compares actual readings from an actual device to theoretical, designed model surfaces. Thus, the correlation program 806 may correlate the three dimensional position of the tracking instrument 224 with the physical component or feature stored in the CAD files 802. Once the correlation program 806 establishes a correlation, the program may generate difference values between the tracking instrument location and specified features in the CAD file 802. These differences may be broadcast on an IP address by the computer 804. The position difference values generated by the correlation program 806 may be displayed for viewing by an operator by using a graphical user interface (GUI) 818. FIG. 12 is a typical screen display provided by the GUI 818 in which the position variances in the x, y and z directions are shown in windows 1202, 1204 and 1206 respectively. The three dimensional position differences are shown at window 1208. The size of the marking window is shown as a value at window 1210, which may correspond to the size of the area on the marking surface 242 within which the markings must be reproduced. An off delay value is displayed at window 1212.

The control program 808 may monitor the difference values shown in FIG. 12 and compare them against location tolerances, input values and/or reference conditions which collectively form a set of preconditions. Providing that the difference values satisfy the preconditions, the control program 808 may output fire command signals that actuate the output device 228. In the embodiment illustrated in FIG. 8, the output device 228 may comprise an ink jet printer 820 mounted on the tracking instrument 224 (FIG. 7). The printer 820 may include a controller 810, a relay 812, a valve 814 and a print head 816. The fire command signals from the computer 804 are delivered to controller 810 which may comprise an R25/210 dual relay controller, for example. The R25/210 dual relay controller is an RS-232 programmable relay controller that is commercially available from a variety of suppliers. Controller 810 is responsive to the fire command signals issued by the control program 808 to activate relay 812 which opens valve 814. The valve 814 allows compressed air to actuate a pneumatic cylinder (not shown) which forces print head 816 to contact the marking surface 242, thereby causing one or more ink dots to be reproduced on the marking surface 242. The relay 812 is closed by the controller 810 when the control program 808 issues a stop command signal.

Figure 9:
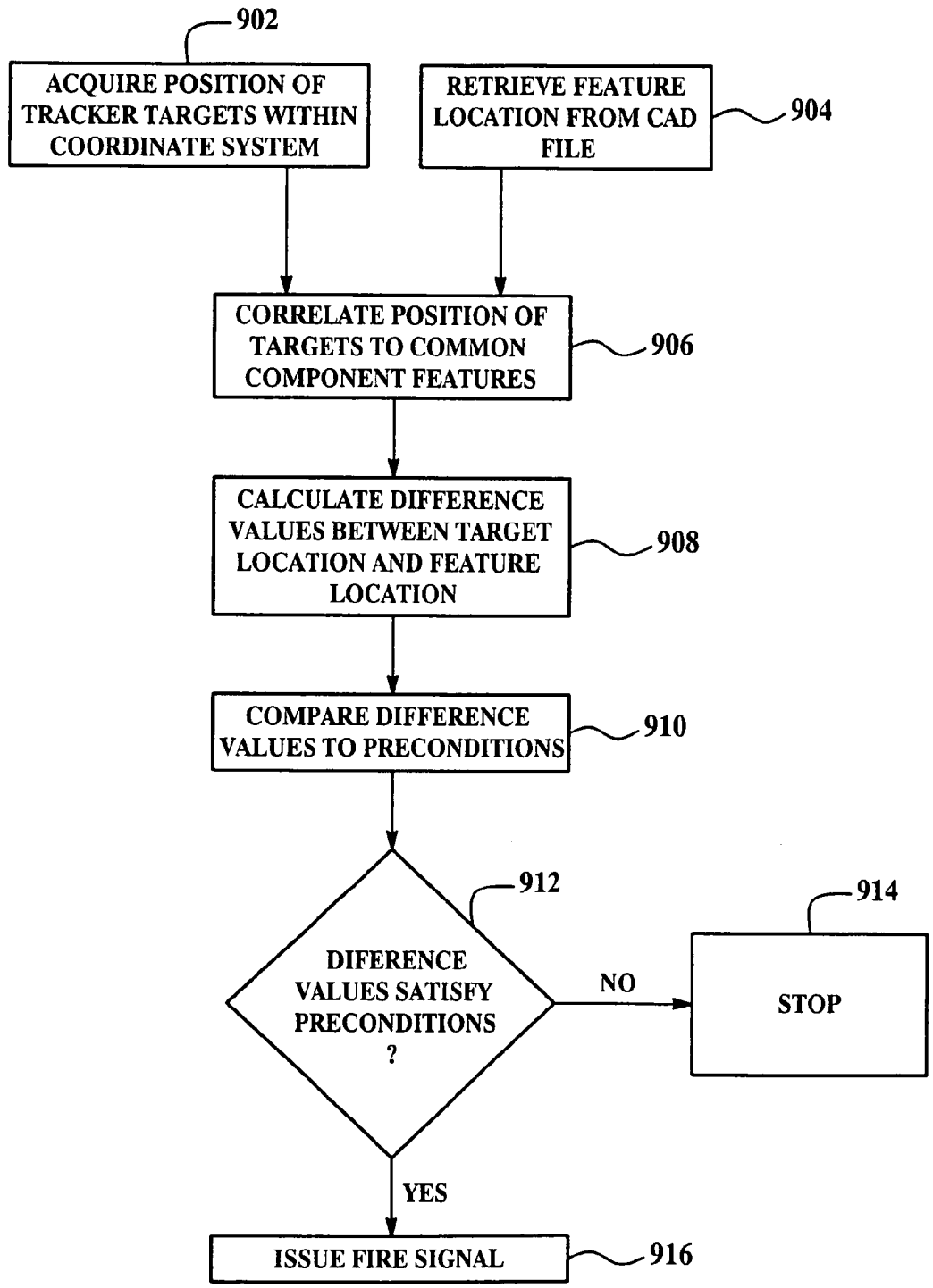
FIG. 9 is a flow diagram of a program for controlling the operation of the output device.

FIG. 9 is a flow chart of the steps performed in carrying out a method for accurately reproducing images on a marking surface 242. As previously described, the three dimensional position of tracker target (tracking ball 225) within a chosen coordinate system may be acquired at 902. The three dimensional coordinates of components or features on the model may be retrieved from a CAD file at 904. Based on the coordinates of the tracker target and the model feature, a correlation may be made between the position of the target and the position of the component features at 906. A calculation may then be made at step 908 to determine the difference values between the target location and the feature location, in terms of the chosen coordinate system. Next at step 910, the difference values may be compared to the each of the preconditions, and at step 912, a determination may be made of whether the difference values satisfy the preconditions. If the difference values satisfy the preconditions, a fire command signal is issued at step 916, otherwise if the difference values do not satisfy the preconditions, the process is stopped at 914, and the fire command signal may not be issued.

Figure 10:
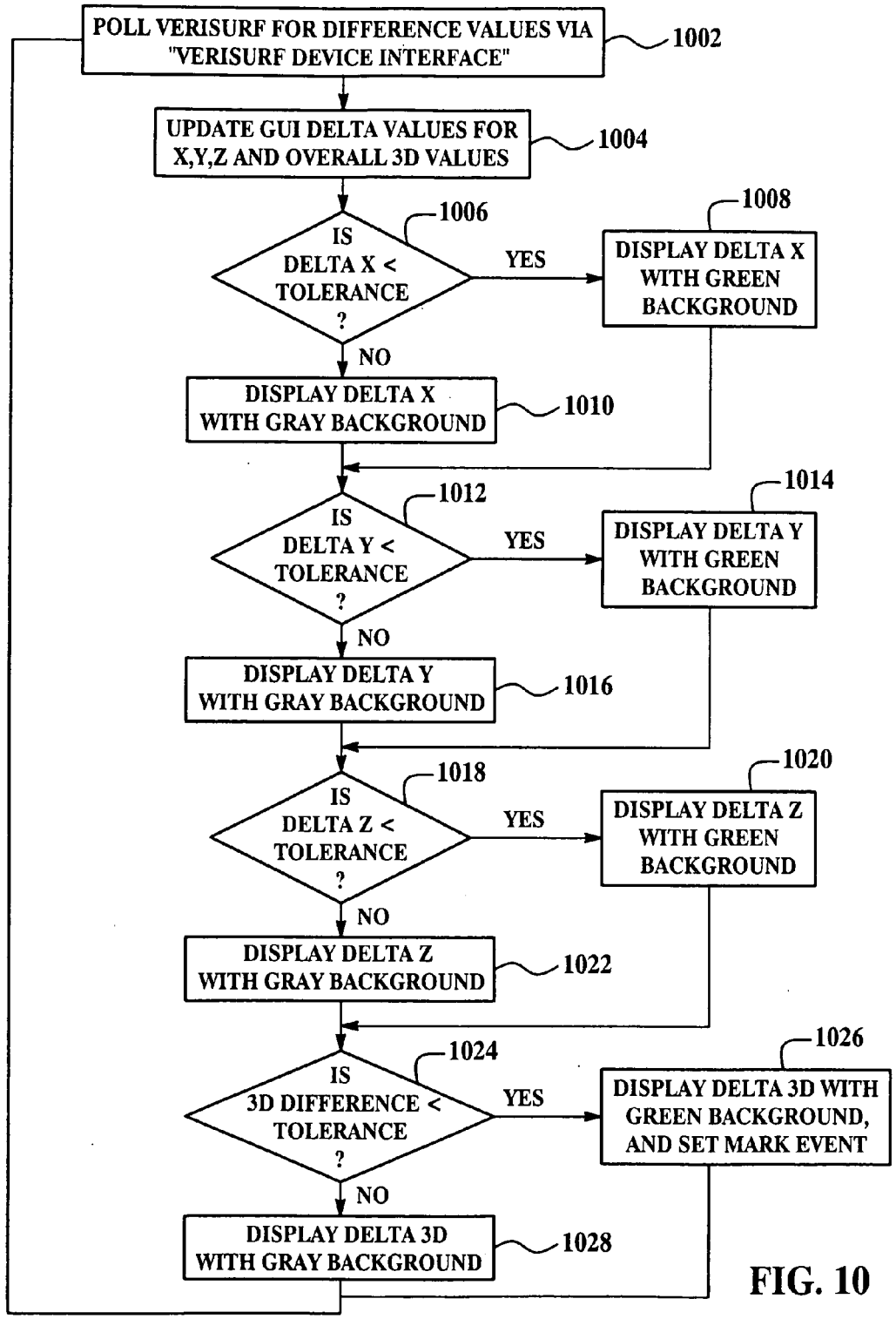
FIG. 10 is a flow diagram of a program for communicating with a tracker position correlation program.

FIG. 10 is a flow chart for the control program 808. At 1002 the correlation program 806 may be polled to obtain the difference values using an interface device (not shown) which may form part of the commercially available VERISURF® software. The difference values obtained at 1002 are used to update the GUI delta values at 1004, for the x,y,z coordinates as well as the overall three dimensional values. A determination may be made at 1006 of whether the change in the x value is within a preset tolerance. If the answer is yes, then the x value may be displayed with a green background in window 1202 of the GUI screen display 1200 shown in FIG. 12. If the change in the x value is not within tolerance, then the value may be shown in window 1202 with a different color background, for example a grey background.

Next, a determination may be made at 1012 of whether the change in the y difference value is within a preset tolerance. If the answer is yes, then change in the y difference value may be displayed with a green background in window 1204 (FIG. 12) as shown at step 1014. If the change in the y difference value is not within tolerance, then at step 1016, the change in the y difference value may be displayed with a grey background in window 1204. Next, at step 1018, a determination is made of whether the change in the z difference value is within tolerance. If the change in the z difference is within tolerance, then at step 1020 the change in the z value may be displayed in window 1208 with a green background. Otherwise, if the change in the z difference value is not within tolerance, the value may be displayed with a grey background, at 1022. Finally, a determination is made at whether the change in the 3-D difference is within tolerance. If the change in the 3-D difference is within tolerance, then at step 1026, the difference value may be displayed in window 1208 with a green background. If the 3-D difference is not within tolerance, then at step 1028 the change in the 3-D difference value may be displayed with a grey background.

Figure 11:
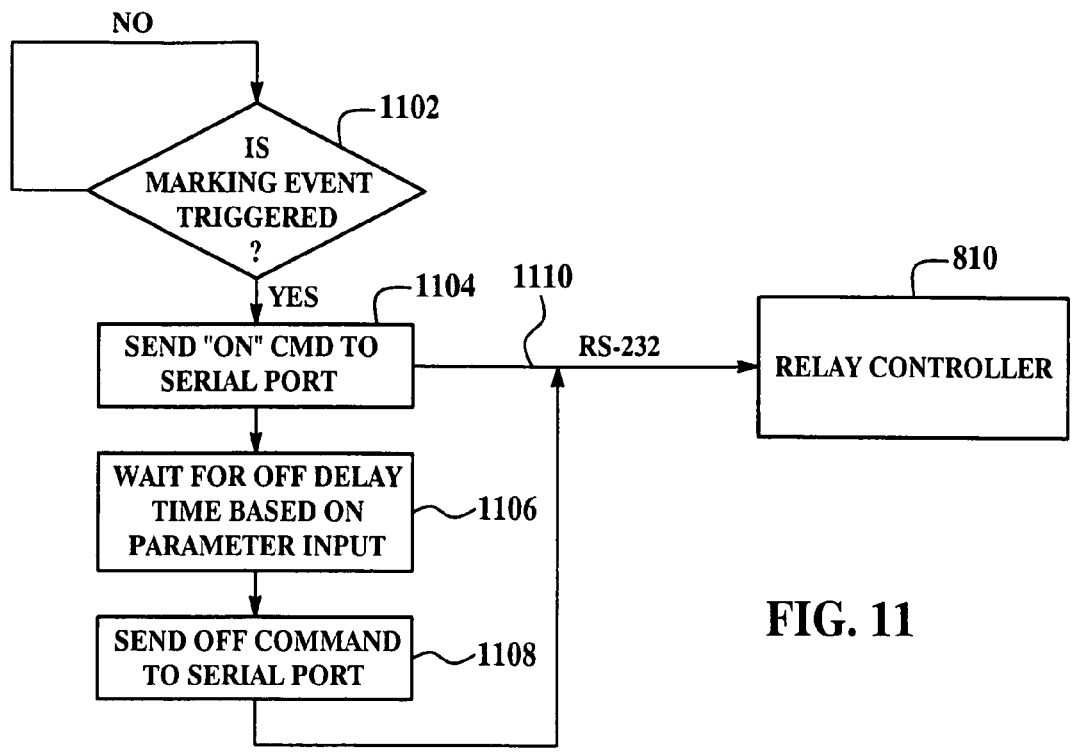
FIG. 11 is a combined block diagram and flow diagram of a program for communicating with the output device.

FIG. 11 is a combined block diagram and flow chart of an additional portion of the control program 808 shown in FIG. 8. A determination may be made at 1102 as to whether the preconditions have been met that would result in a fire command signal being issued to produce a marking. If a marking event has been triggered at 1102, then at step 1104, an "on" or fire command signal may be sent to an RS-232 serial port 1110 at step 1104 which connects computer 804 to the controller 810. Next, at 1106, the program waits for a predetermined period, referred to as the "off delay time" which may be selected by an operator using the GUI 818. This off delay time, which is shown in the window 1212 in FIG. 12, may comprise the period of time that the output device 228 must remain off before being actuated by a subsequent fire command signal. At 1108, an off command signal may be generated and sent via the serial port 1110 from the computer 804 to the controller 810, which causes the relay 812 to remain off for during the off delay time.

From the forgoing, it can be appreciated that the location at which markings or images are reproduced on the marking surface 242 are closely controlled. In the event that the tracking instrument 224 is not within a specified range of the exact location to be marked, the printer or other output device 228 may be prevented from marking the surface 242.

While preferred and alternate embodiments of the invention have been illustrated and described, as noted above, many changes can be made without departing from the spirit and scope of the invention. Accordingly, the scope of the invention is not limited by the disclosure of these preferred and alternate embodiments. Instead, the invention should be determined entirely by reference to the claims that follow.

What is claimed is:

1. A system configured to reproduce a two dimensional image onto a surface, comprising:
    a three-dimensional model containing a feature to be reproduced as a two dimensional image onto the surface, said image reproduced onto said surface by marking onto an unmarked portion of said surface only a single two dimensional image, an image upper surface being exposed, the three-dimensional model comprising a digital file;
    an imaging device movable over the surface and configured to reproduce the feature as said image on the surface at a first location based on a second location of the feature in the three-dimensional model, the second location of the feature defined by a first three dimensional coordinate system in the digital file, said second location of said feature with respect to said surface determined by correlating a position of the imaging device with respect to reference points comprising a digitally produced plane surface normal from a model surface of said three-dimensional model, said digitally produced plane surface not comprising said three-dimensional model, the position of the imaging device defined in a second three dimensional coordinate system different than the first three dimensional coordinate system;
    a tracker configured to track a three dimensional position of the imaging device, based on a coordinate system;
    a computer correlation program configured to correlate a position of the imaging device determined by the tracker with a three dimensional position of the feature in the three-dimensional model, to generate a correlated position of the imaging device, and to generate difference values between the position of the imaging device with the three dimensional position of the feature in the three-dimensional model; and,
    a controller configured to control operation of the imaging device based on the correlated position and to monitor the difference values with a set of preconditions.

2. The system of claim 1, further comprising a program for controlling the operation of the imaging device based on the correlated position of the imaging device.

3. The system of claim 1, further comprising a display configured to display differences in coordinate values representing the locations of the feature and the imaging device in a common coordinate system.

4. The system of claim 1, wherein the first location is characterized by coordinates and values of the coordinates, and the system further comprises a computer configured to run the computer correlation program to calculate differences in the values of the coordinates of locations of the feature and the imaging device in a common coordinate system.

5. The system of claim 4, wherein the computer includes a control program configured to control the operation of the imaging device based on the calculated differences in the coordinates of the locations of the feature and the imaging device.

6. The system of claim 1, wherein said surface comprises a contoured surface.

7. A method for reproducing a two dimensional image onto a surface, comprising the steps of:
 determining a first position of features on a three dimensional model, the three-dimensional model comprising a digital file and the position of the features defined by a first three dimensional coordinate system in the digital file;
 moving an imaging device over the surface;
 determining a second position of the imaging device, the second position of the imaging device defined in a second three dimensional coordinate system different than the first three-dimensional coordinate system;
 correlating the first position of the features in the three-dimensional model with the second position of the imaging device, so as to generate a correlation, said correlation comprising correlating the second position of the imaging device with respect to reference points comprising a digitally produced plane surface normal from a surface of said three-dimensional model, said digitally produced plane not comprising said three-dimensional model; and,
 reproducing an image of each of the features onto the surface at a respective location on the surface based on the correlation, said image reproduced onto said surface by marking onto an unmarked portion of said surface only a single two dimensional image, an image upper surface being exposed, said image reproduced onto the surface based on whether the imaging device is within a location tolerance in three dimensions of said imaging device with respect to a corresponding feature.

8. The method of claim 7, wherein determining the first position of features on a three dimensional model is performed by retrieving coordinates from a digital file representing the three-dimensional model.

9. The method of claim 7, wherein determining the second position of the imaging device is performed using a non-contact tracking device.

10. The method of claim 7, wherein correlating the first position of the features is performed using a programmed computer executing program instructions stored in memory.

11. The method of claim 7, further comprising the steps of:
 generating difference values representing a difference between the second position of the imaging device and the first position of the features; and,
 comparing the difference values with a set of preconditions comprising said location tolerance in three dimensions, and
 wherein reproducing an image is performed based comparing the difference values with the set of preconditions.

12. The method of claim 7, wherein said surface comprises a contoured surface.

13. A method for reproducing a two dimensional image onto a surface, comprising the steps of:
 obtaining a first three dimensional location of a feature in a model, the model comprising a digital file and the first three dimensional location of the feature defined by a first three dimensional coordinate system in the digital file;
 obtaining a second three dimensional location of an imaging device, the second three dimensional location of the imaging device defined in a second three dimensional coordinate system different than the first three dimensional coordinate system;
 correlating the first three dimensional location of the feature with the second three dimensional location of the imaging device based on a common three dimensional coordinate system, so as to generate a correlation;
 determining a location on the surface where an image of the feature should be reproduced based on the correlation, said location determined by correlating a position of the imaging device with respect to reference points comprising a digitally produced plane surface normal from a surface of said model, said digitally produced plane not comprising said model; and,
 reproducing an image of the feature at the location determined from the step of determining a location, using the imaging device, said image reproduced onto said surface by marking onto an unmarked portion of said surface only a single two dimensional image, an image upper surface being exposed, said image reproduced at said location based on whether the imaging device is within a location tolerance in three dimensions of said imaging device with respect to a corresponding feature.

14. The system of claim 13, wherein said surface comprises a contoured surface.

* * * * *